US012192114B1

(12) United States Patent
Urie et al.

(10) Patent No.: US 12,192,114 B1
(45) Date of Patent: Jan. 7, 2025

(54) DIRECT CONFLICT MITIGATION IN NEAR REAL-TIME RADIO ACCESS NETWORK INTELLIGENT CONTROLLERS

(71) Applicant: Nokia Solutions and Networks Oy, Espoo (FI)

(72) Inventors: Alistair Urie, Massy (FR); Paul Stephens, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/747,924

(22) Filed: Jun. 19, 2024

(30) Foreign Application Priority Data

Jul. 3, 2023 (FI) ..................................... 20235784

(51) Int. Cl.
  *H04L 47/74* (2022.01)
  *H04L 47/80* (2022.01)
(52) U.S. Cl.
  CPC .......... *H04L 47/748* (2013.01); *H04L 47/803* (2013.01)
(58) Field of Classification Search
  CPC ..... H04W 28/16; H04W 24/04; H04W 28/18; H04W 28/24; H04W 24/10; G06N 5/04
  See application file for complete search history.

(56) References Cited

U.S. PATENT DOCUMENTS

| 11,570,627 | B1 | 1/2023 | Montalvo | |
| 11,751,064 | B1 * | 9/2023 | Montalvo | ......... H04W 72/0453 |
| | | | | 455/423 |
| 2022/0124543 | A1 * | 4/2022 | Orhan | .................... G06N 3/006 |
| 2023/0069604 | A1 | 3/2023 | Jayavelu et al. | |
| 2023/0209370 | A1 * | 6/2023 | Pateromichelakis | .. G06N 20/00 |
| | | | | 370/328 |

(Continued)

FOREIGN PATENT DOCUMENTS

| CA | 3206693 A1 | 9/2022 |
| WO | 2015/165525 A1 | 11/2015 |

(Continued)

OTHER PUBLICATIONS

"O-RAN Working Group 3 (Near-Real-time RAN Intelligent Controller and E2 Interface Workgroup) Near-RT RIC Architecture", O-RAN Alliance, O-RAN.WG3.RICARCH-R003, V04.00, Mar. 2023, pp. 1-115.

(Continued)

*Primary Examiner* — Chirag R Patel
(74) *Attorney, Agent, or Firm* — Nokia Solutions and Networks Oy

(57) ABSTRACT

Direct conflict mitigation in near real-time radio access network intelligent controllers is provided. A method for direct conflict mitigation in near real-time radio access network intelligent controllers may include determining a potential conflict between subsets of services that are requested for two or more applications among an available set of services of an intelligent controller. The apparatus may transmit conflict negotiation requests to each of the two or more applications requesting that the two or more applications perform conflict negotiation between each other to allocate the subsets of services among the available set of services, and process responses from each of the two or more applications indicating results of the conflict negotiation.

15 Claims, 11 Drawing Sheets

(56) References Cited

U.S. PATENT DOCUMENTS

| | | | |
|---|---|---|---|
| 2024/0098568 A1* | 3/2024 | Curic | H04W 28/0925 |
| 2024/0259879 A1* | 8/2024 | Ranganath | H04W 24/10 |

FOREIGN PATENT DOCUMENTS

| | | |
|---|---|---|
| WO | 2023/283102 A1 | 1/2023 |
| WO | 2023/091664 A1 | 5/2023 |

OTHER PUBLICATIONS

"O-RAN Working Group 3 (Near-Real-time RIC and E2 Interface Workgroup) Near-RT RIC APIs specification", O-RAN Alliance, O-RAN-WG3.RICAPI-R003, V01.00, Mar. 2023, pp. 1-101.

"O-RAN Work Group 3 (WG-3) Near-Real-time RAN Intelligent Controller and E2 Interface E2 General Aspects and Principles (E2GAP)", O-Ran Alliance, O-RAN.WG3.E2GAP-R003, V03.00, Mar. 2023, pp. 1-49.

"O-RAN Work Group 3 (WG-3) Near-Real-time RAN Intelligent Controller and E2 Interface E2 Application Protocol (E2AP)", O-Ran Alliance, O-RAN.WG3.E2AP-R003, V03.00, Mar. 2023, pp. 1-119.

"O-RAN Work Group 3 (WG-3) Near-Real-time RAN Intelligent Controller and E2 Interface E2 Service Model (E2SM)", O-Ran Alliance, O-RAN.WG3.E2SM-R003, V03.00, Mar. 2023, pp. 1-36.

"O-RAN Working Group 3 Near-Real-time RAN Intelligent Controller E2 Service Model (E2SM), Ran Control", O-RAN Alliance, ORAN.WG3.E2SM-RC, V01.03, Oct. 2022, pp. 1-336.

Hahn et al., "Final report on a unified self-management system for heterogeneous radio access networks", Semafour, INFSO-ICT-316384 D6.6, V1.0, Aug. 31, 2015, pp. 1-106.

Zhang et al., "Team Learning-Based Resource Allocation for Open Radio Access Network (O-RAN)", arXiv, Jan. 19, 2022, 6 pages.

Adamczyk et al., "Conflict Mitigation Frameworknand Conflict Detection in O-RAN Near-RT RIC", IEEE Communications Magazine, vol. 61, No. 12, Dec. 2023, pp. 1-7.

Polese et al., "Understanding O-RAN: Architecture, Interfaces, Algorithms, Security, and Research Challenges", arXiv, Aug. 1, 2022, pp. 1-33.

"Mavenir's Ran Intelligent Controller", Mavenir, 2022, pp. 1-5.

Office action received for corresponding Finnish Patent Application No. 20235784, dated Nov. 29, 2023, 12 pages.

Adamczyk et al., "Detection and mitigation of indirect conflicts between xApps in Open Radio Access Networks", IEEE Conference on Computer Communications Workshops (Infocom Wkshps), May 20-23, 2023, 2 pages.

Office action received for corresponding Finnish Patent Application No. 20235784, dated May 13, 2024, 8 pages.

Extended European Search Report received for corresponding European Patent Application No. 24182229.5, dated Oct. 24, 2024, 5 pages.

* cited by examiner

DIRECT CONFLICT MITIGATION IN NEAR REAL-TIME RADIO ACCESS NETWORK INTELLIGENT CONTROLLERS

RELATED APPLICATION

This application claims benefit of priority from Finnish Patent App. No. 20235784, filed Jul. 3, 2023, the disclosure of which is hereby incorporated in its entirety by reference herein.

TECHNICAL FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to direct conflict mitigation in near real-time (RT) radio access network (RAN) intelligent controllers (Near-RT RIC).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems may refer to a next generation (NG) of radio systems and network architecture. It is estimated that the 5G (or NR) may provide bitrates on the order of 10-20 Gbit/s or greater and may support at least enhanced mobile broadband (eMBB) and ultra-reliable low-latency communication (URLLC), as well as, massive machine-type communication (mMTC). NR is expected to deliver extreme broadband and ultra-robust, low-latency connectivity and massive networking to support the Internet of Things (IoT).

SUMMARY

Various example embodiments may provide an apparatus including at least one processor and at least one memory storing instructions that, when executed by the at least one processor, cause the apparatus at least to determine a potential conflict between subsets of services that are requested for two or more applications among an available set of services of an intelligent controller. The apparatus may also be caused to transmit conflict negotiation requests to each of the two or more applications requesting that the two or more applications perform conflict negotiation between each other to allocate the subsets of services among the available set of services, and process responses from each of the two or more applications indicating results of the conflict negotiation.

Certain example embodiments may provide an apparatus including at least one processor and at least one memory storing instructions that, when executed by the at least one processor, cause the apparatus at least to receive a conflict negotiation request from a network platform function requesting to perform conflict negotiation with one or more applications to allocate subsets of services among an available set of services. The apparatus may also be caused to perform the conflict negotiation that allocates the subsets of services among the available set of services between the apparatus and the one or more applications, and transmit a response message to the network platform function indicating results of the conflict negotiation.

BRIEF DESCRIPTION OF THE DRAWINGS

For proper understanding of example embodiments, reference should be made to the accompanying drawings, as follows.

DETAILED DESCRIPTION

Figure 1A:
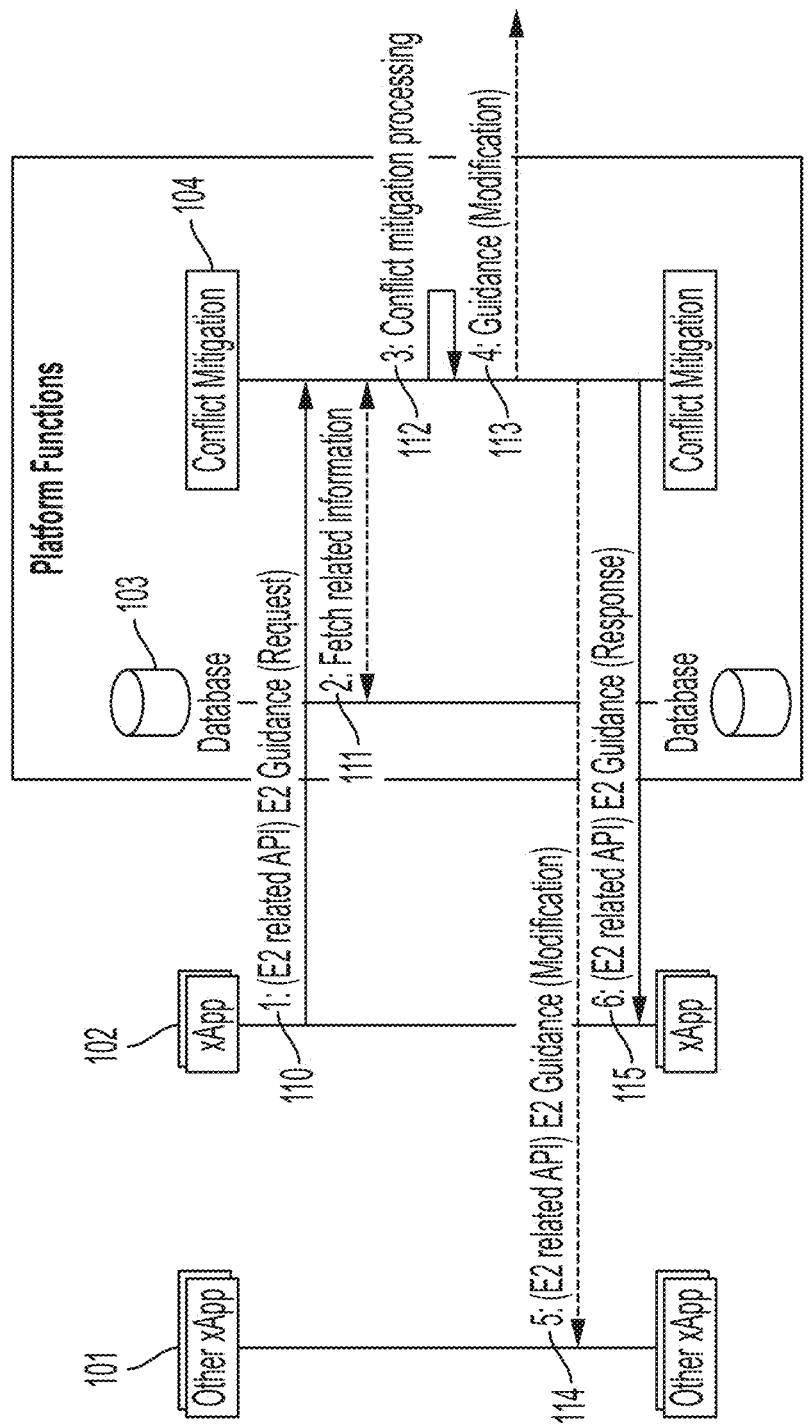
FIG. 1A illustrates a signal diagram of one known technique to identify interactions between platform functions and xApps.

It will be readily understood that the components of certain example embodiments, as generally described and illustrated in the figures herein, may be arranged and designed in a wide variety of different configurations. The following is a detailed description of some example embodiments of systems, methods, apparatuses, and non-transitory computer program products for direct conflict mitigation in Near-RT RIC. Although the devices discussed herein and illustrated in the figures refer to 5G or Next Generation NodeB (gNB) devices, this disclosure is not limited thereto.

Additionally, if desired, the different functions or procedures discussed herein may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

In 5G/NR technology, an open radio access network (O-RAN) architecture extends the functionality of 3GPP defined mobile networks. The O-RAN architecture may include a Near-RT RAN intelligent controller (Near-RT RIC) which may provide an O-RAN defined E2 interface towards the radio access network (RAN), which provides a means for interconnecting a Near-RT RIC and two or more nodes. The E2 interface is an open interface between two end points, i.e., the Near-RT RIC and the so-called E2 nodes, i.e., DUs, CUs in 5G and O-RAN compliant eNBs in 4G. E2 interface allows the Near-RT RIC to control procedures and functionalities of the E2 nodes.

An E2 application protocol (E2AP) may support the functions of the E2 interface by signaling procedures defined in the O-RAN. There may be a single E2 interface on a centralized unit-control plane (CU-CP) for an entire RAN, or individual E2 interfaces on each RAN component. The Near-RT RIC may be deployed in a mobile network as either a standalone network function, or may be deployed co-located with the one or more RAN components as an integrated solution, for example, as a combined Near-RT RIC and CU-CP. The Near-RT RIC may include a Near-RT RIC platform and one or more applications known as xApps. The E2AP protocol may be terminated in the Near-RT RIC platform and one or more individual E2 service model (E2SM) protocols supported by the specific E2 Node may be terminated in one or more applications, such as xApps. An example RICAPI may be the E2 Guidance application programming interface (API) which may be used by an xApp to obtain guidance from a conflict mitigation function prior to initiating other E2 related procedures.

xApps in Near-RT RIC may provide value added services using RIC functional mechanisms and related procedures via E2 interface towards E2 Nodes. The E2 related APIs may allow access to E2 related functionality and the associated xApp subscription management and conflict mitigation functions, which include an E2 subscription (Request, Reject/Success/Failure), E2 subscription delete (Request, Reject/Success/Failure), E2 subscription delete query (Required, Accept/Decline), E2 subscription delete notification (Deleted), E2 indication (Push, Failure), E2 control (Request, Reject/Success/Failure), and/or E2 guidance (Request, Response, Modification).

The Near-RT RIC may host a number of logical functions. An example function provided by the Near-RT RIC platform may be the conflict mitigation function which may be responsible for addressing conflicting interactions between different xApps. Conflict mitigation may be used for a variety of types of conflicts including, but not limited to, direct conflicts, indirect conflicts, and/or implicit conflicts. Conflict mitigation may anticipate the possible conflicts and take actions to mitigate them. Direct conflicts may be conflicts between xApps observed directly by the conflict mitigation function. Indirect conflicts may be conflicts between xApps that cannot be observed directly, but nevertheless, some dependence among the parameters and resources that the xApps target can be observed. Implicit conflicts may be conflicts between xApps that cannot be observed directly and the dependence between xApps is not obvious or observable.

Figure 1B:
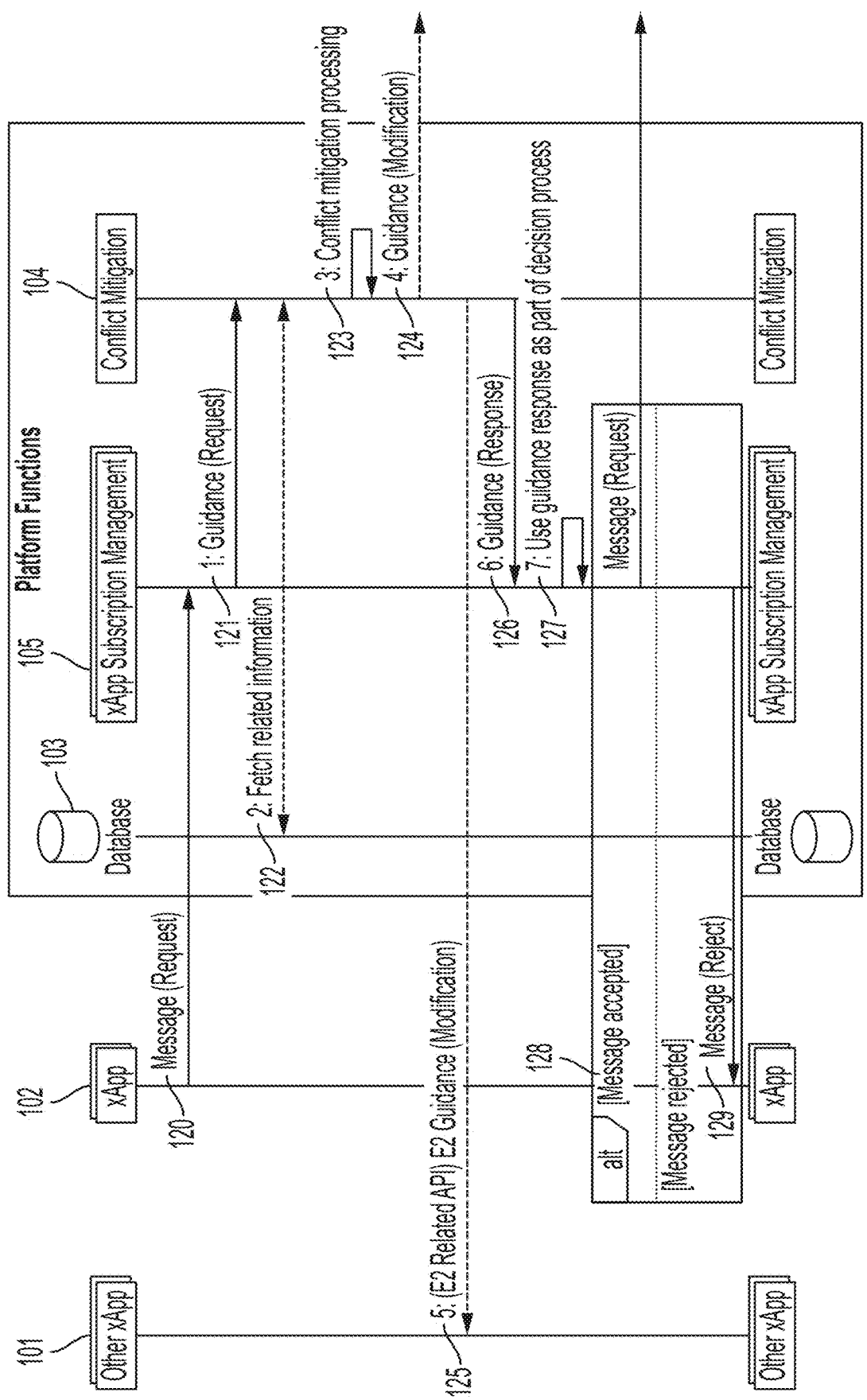
FIG. 1B illustrates a signal diagram of another known technique to identify interactions between platform functions and xApps.
Figure 1C:
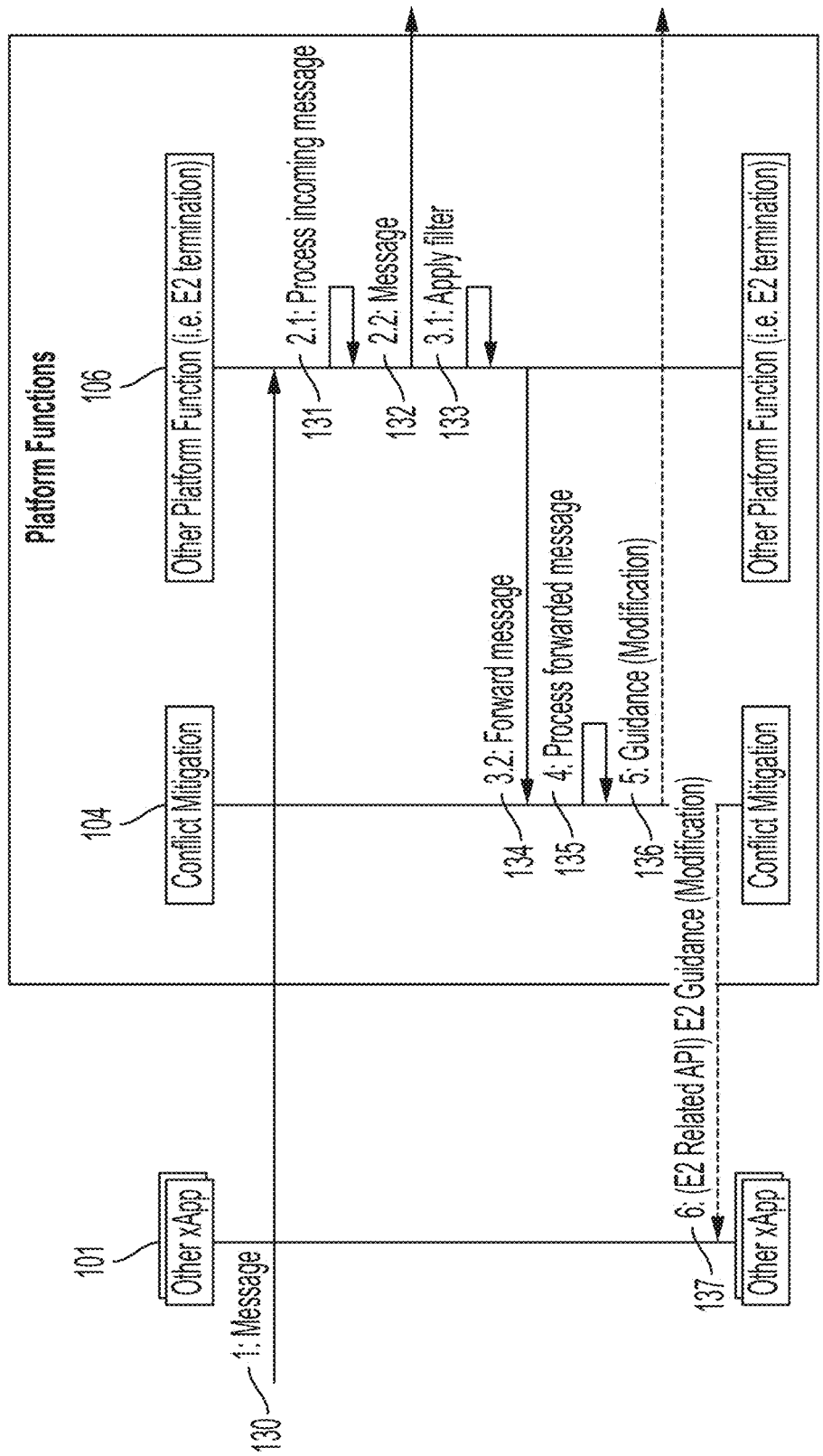
FIG. 1C illustrates a signal diagram of a further known technique to identify interactions between platform functions and xApps.

FIGS. 1A-1C illustrate known techniques to identify interactions between the conflict mitigation function and other platform functions and xApps. FIG. 1A illustrates, at 110, an xApp 102 may transmit an E2 guidance request to a conflict mitigation function 104, and at 111, the conflict mitigation function 104 may fetch and/or receive E2 related API information from a database or storage 103. At 112, the conflict mitigation function 104 may perform conflict mitigation processing to determine one or more conflicts between the xApp 102 and the other xApp 101. At 113, the conflict mitigation function 104 may provide E2 guidance on how to handle the one or more conflicts, which may include guidance to modify operations of the other platform functions. At 114, the conflict mitigation function 104 may provide the E2 guidance to the other xApp 101, and at 115, the conflict mitigation function 104 may provide the E2 guidance to the xApp 102.

FIG. 1B illustrates at 120, an xApp 102 may transmit a message or request to an xApp subscription management function 105, and at 121, the xApp subscription management function 105 may transit a guidance request to the conflict mitigation function 104. At 122, the conflict mitigation function 104 may fetch and/or receive E2 related API information from a database or storage 103. At 123, the conflict mitigation function 104 may perform conflict mitigation processing to determine one or more conflicts between the xApp 102 and other xApp 101. At 124, the conflict mitigation function 104 may provide E2 guidance on how to handle the one or more conflicts, which may include guidance to modify operations of the other platform functions. At 125, the conflict mitigation function 104 may provide the E2 guidance to the other xApps 101, and at 126, the conflict mitigation function 104 may provide the E2 guidance to the xApp subscription management function 105. At 127, the xApp subscription management function 105 may use the E2 guidance as part of a decision process. At 128, the xApp subscription management function 105 may transmit a message and/or request to other platform functions when the message or request transmitted from the xApp 102 is accepted, or alternatively, at 129, when the message or request is rejected, the xApp subscription management function 105 may transmit a rejection message to the xApp 102.

FIG. 1C illustrates, at 130, the other xApp 101 may transmit a message to a platform function 106, such as an E2 termination function, and at 131, the platform function 106 may process the incoming message from the other xApp 101. At 132, the platform function 106 may transmit a message to other platform functions. At 133, the platform function 106 may apply a filter to the incoming message, and at 134, the platform function 106 may forward the filtered message to the conflict mitigation function 104. At 135, the conflict mitigation function 104 may process the forwarded message, and at 136, the conflict mitigation function 104 may transmit guidance to one or more platform functions. At 137, the conflict mitigation function 104 may transmit E2 guidance to the other xApp 101.

While the principles of the Near-RT RIC platform hosting the conflict mitigation function may be known, the known techniques may not provide detailed specifications of the messages to and from the xApps, may not provide any mechanism for detecting and resolving potential conflicts, and may not support the case where the Near-RT RIC platform is not aware of the content and encoding methods used by the specific E2SM protocol. Conflict mitigation may be a known issue in self-optimized networks (SON) with solutions based on both heuristic algorithms and machine learning (ML) based solutions.

Various example embodiments may provide advantages to resolve issues known in the technology, such as the issues discussed above. For example, certain example embodiments may advantageously provide one or more procedures for a conflict mitigation function to detect a potential conflict between two or more xApps and then initiate a negotiation between the identified xApps to identify and resolve these conflicts without requiring the platform to understand the E2SM level encoding. The various example embodiments may avoid the need for the Near-RT RIC platform to decode the E2SM level messages. Certain example embodiments may also be applied when a conflict mitigation process needs to rely on negotiation between potential sources of conflict without needing to understand the specific details of the mechanisms used by these processes.

Various example embodiments may be based on observation that one or more xApps may resolve a majority of direct conflict scenarios using an agreement on which the one or more xApps has for a specific RIC Service. Certain example embodiments may define how data or information exchanged between xApps during the negotiation process of the conflict mitigation may be encoded using an E2SM specific definition.

Certain example embodiments may provide conflict mitigation that identifies the first xApp to use a specific RIC service using a given E2SM and RAN function instance on a given E2 Node. The conflict mitigation may identify when an additional xApp likely to be using the same RIC Service. Related services of the Near-RT RIC may be provided over the E2 interface and may be classified into five classes: REPORT, INSERT, CONTROL, POLICY, and QUERY using the same E2SM and RAN function on the same E2 Node. The conflict mitigation may rely on either the xApp initiated E2 guidance procedure or via observation of xApp initiated E2 related APIs, such as E2 subscription and E2 control procedures.

An E2 guidance API may include request, response, and/or modification messages. The request may be a requested E2 service scope, a previous negotiation key, and/or recent E2 related API messages. The response may indicate approval, rejection, or revocation, and the modification message may indicate a revision or a revocation. The E2 guidance API, such as a negotiation request or a negotiation response, may provide for negotiation message transfer in which a request including a list of xApps with potentially conflicting service requirements may be sent with a negotiation key to each xApp. The negotiation message may transfer the negotiation key and may be either passed via the conflict mitigation function or using direct xApp-to-xApp messaging/communication. A response (e.g., agreement or failure to reach an agreement) may be sent with the negotiation key by each xApp after the negotiation process. The negotiation key may be used by xApps to indicate that a particular service request is according to previously established agreement.

The E2 Guidance API may also facilitate an audit request and audit response to allow conflict mitigation to seek conflict mitigation auditing from an xApp to confirm if a recent message sent by another xApp is in line with a previously established negotiation agreement (e.g., that xApp2 agrees that a recent message from xApp1 is respecting the negotiated agreement).

An E2AP level scope may be defined by an E2 node ID, a RAN function ID, and/or an RIC action type using information exposed over other E2 related API messages. The E2AP level scope may be used to identify xApps that may be in potential direct conflict (i.e., to find all xApps that are using the RIC action type policy for a particular RAN function ID on a particular E2 Node using a particular E2SM protocol. For the case where the Near-RT RIC platform is not aware of the content and encoding methods used by the specific E2SM protocol, the Near-RT RIC platform provided E2 Guidance API may be used to transfer E2SM specific information between xApps and be used by xApps in potential direct conflict to reach agreements on which xApp may issue which E2SM specific messages. For example, a list of identified xApps that agree on which xApp may issue E2 control request for a specific control style and action type using E2SM-RC specific parameters. This agreement between xApps may be encoded using the E2SM specific RAN Function Definition (RFD) IE format with contents equal to a subset of the RFD declared by the E2 Node for the target RAN function. The set of identified potential direct conflict xApps may reach an agreement on how to partition the set of services offered by the specific RAN Function on the specific E2 Node into a mutually exclusive collection of subsets of services and hence direct conflicts between the identified xApps may be avoided.

Some example embodiments may provide conflict mitigation to request identified xApps to negotiate and determine which xApp issues each specific E2SM level service. For example, for the specific E2SM protocol for Radio Control (E2SM-RC), the conflict mitigation may determine which xApps may be in potential direct conflict and request the identified xApps to negotiate. The identified xApps may then negotiate with each other sending E2SM specific encoded "bids" concerning which xApp shall use a specific service style, service action and/or subset of RAN parameters associated with the specific service. Upon completion of negotiation, all xApps inform the conflict mitigation function of the outcome, such as success or failure. Conflict mitigation may perform a final decision and transmit E2 guidance or modification to some or all identified xApps and may also transmit similar guidance or modification messages to Near-RT RIC platform services.

Certain example embodiments may provide a detection process of a first xApp by the conflict mitigation function to detect use of a service provided by the platform. The conflict mitigation function may record, or otherwise store, which xApp is the first xApp to use a particular RIC service using a given E2SM and RAN function on a given E2 Node. An initial E2 guidance API (e.g., Request/Response) may be used which is from an xApp and/or which instructs the conflict mitigation function to monitor ongoing transactions within the Near-RT RIC platform, such as, for example, the E2 Termination function and/or the xApp subscription management function. Since this detection process may involve only a single xApp and may not use E2SM encoded information, the xApp may be allocated access based on the E2AP level service identified by an E2 node ID, a RAN function ID, and/or an RIC action type. Each time an additional xApp requests E2 guidance or initiates an E2 transaction, the conflict mitigation function may request that the new xApp negotiates with all known (e.g., previously detected or communicated with) xApps using the same E2AP level service identified by an E2 node ID, a RAN function ID, and/or an RIC action type.

Negotiation between all xApps using the same E2AP level service may be configured by the conflict mitigation function. A unique negotiation key may be assigned and sent to all identified xApps detected using the same E2AP level service. The negotiation key may be issued by the conflict mitigation function and used to identify a specific negotiation process between xApps. The negotiation key may be subsequently used by xApps and Near-RT RIC platform functions, such as the conflict mitigation function, xApp subscription management function, E2 termination, and the like, to reference negotiation outcomes. Each xApp may use an E2SM specific encoded RAN Function Definition data structure to describe or bid for which subset of the declared E2 Node supported RIC services are needed for the xApp. The xApp may exchange these bids between the identified xApps. This is an example of a negotiation between the xApps for the available resources, which may be the conflict mitigation. For example, if the set of identified xApps are attempting to use the same RIC service type for a RAN function that supports E2SM-RC, each xApp may propose or bid or request to only use certain RIC service styles, a control action ID, and/or particular subsets of RAN parameters. This negotiation may continue until either all xApps agree that the proposed subsets are mutually exclusive or there is a failure to reach an agreement. Once the negotiation is terminated, all xApps may send a negotiation outcome message to the conflict mitigation function containing the same negotiation key, an agreement outcome (e.g., success or failure) and the individual E2SM encoded subsets of the RAN function description.

If an agreement is reached (e.g., the agreement outcome is success), the conflict mitigation function may store, in a database or other storage, the agreement outcome for future reference. The conflict mitigation function may inform other platform functions in the Near-RT RIC platform that subsequent service requests from xApps containing a given negotiation key may be considered to be without conflict. The conflict mitigation function may continue to monitor ongoing service requests and may initiate a negotiation audit procedure to seek verification that a given service request from an xApp is appropriate and has been issued according to the negotiated agreement.

If a negotiated agreement has not reached (e.g., the agreement outcome is failure), an error response may be sent to the conflict mitigation function which may then determine the best solution. For example, the conflict mitigation function may block a most recent xApp, block all xApps, accept a potential conflict, and/or use other mechanisms to determine if an actual conflict occurs.

Various example embodiments may provide a conflict mitigation procedure in which the conflict mitigation function may detect one or more potential conflicts using E2AP level information and may check stored information on previous negotiation agreements addressing the same E2AP level. The conflict mitigation may initiate negotiation by sending the same message to all detected xApps using the same E2AP level scope in service requests. The xApps may then negotiate by exchanging messages containing proposed subsets of E2SM specific RAN function definition (RFD) IDs. The exchange of messages may be performed using either direct xApp-to-xApp messaging or relayed via the conflict mitigation function. Subsequently, all of the xApps may respond to the negotiation requests providing a negotiation outcome for the potential conflicts. The conflict mitigation may receive and evaluate all of the responses. If all responses from the xApps provide the same response indicating whether or not an agreement was reached for the subsets of the declared E2 Node supported RIC services, the result may be stored in the database.

Figure 2:
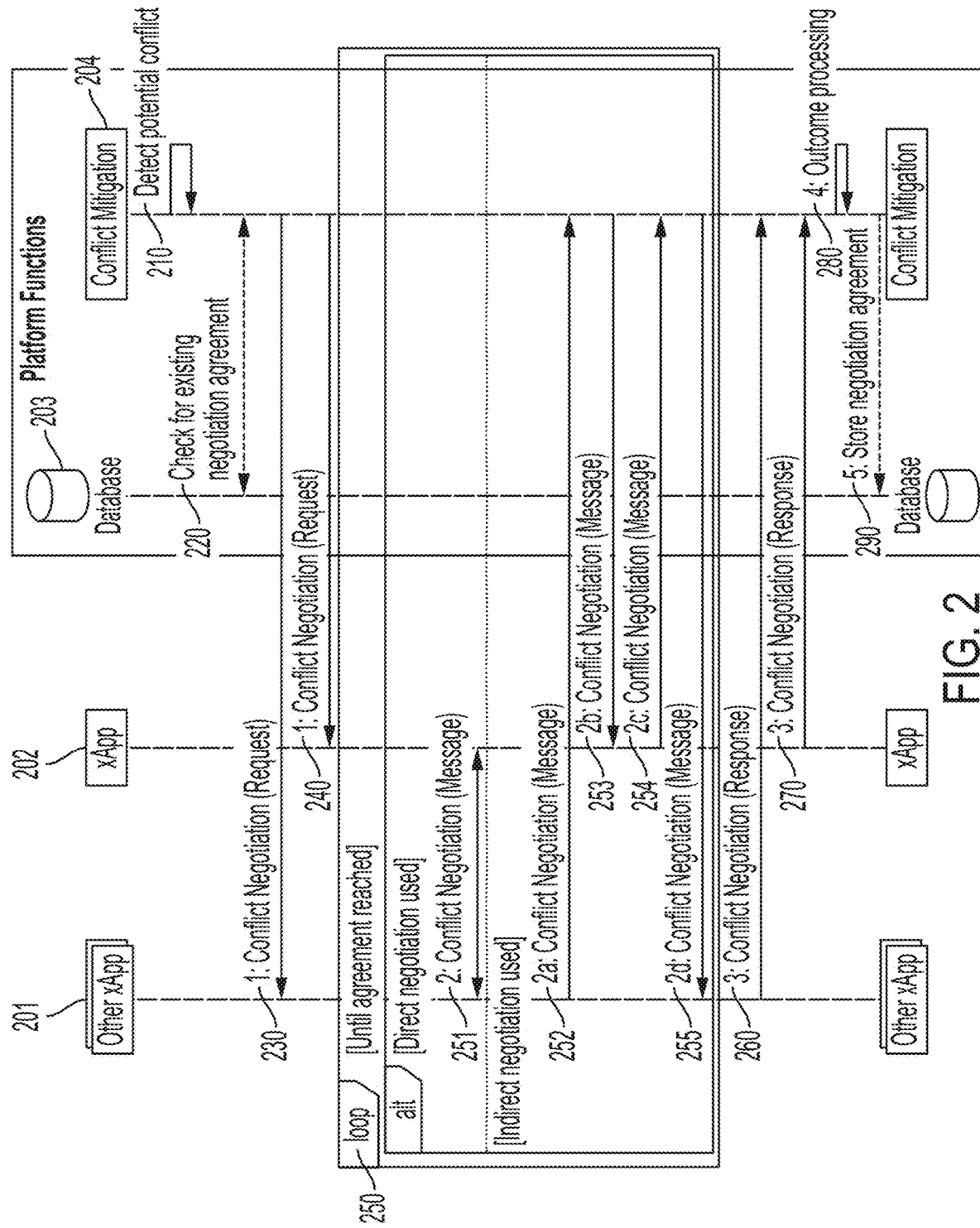
FIG. 2 illustrates an example signal diagram of one or more procedures for conflict mitigation, according to various example embodiments.

FIG. 2 illustrates an example signal diagram of one or more procedures for conflict mitigation, according to various example embodiments. In FIG. 2, the example system or network may include one or more other xApps 201, an xApp 202, a database of the platform 203, and a conflict mitigation function of the platform 204. In this example, two or more xApps may be using the same E2AP level RIC service. The conflict mitigation function 204 may have access to sufficient information to detect a potential conflict at the E2AP level (E2 node ID, RAN function ID, RIC action type) and verify if an existing negotiation agreement is in place. Each xApp has been assigned an xApp ID and the xApps have a latest RAN Function Description (RFD) for the specific RAN Function ID.

At 210, the conflict mitigation function 204 may detect a potential conflict between one or more of the xApps 201 and the xApp 202. At 220, the conflict mitigation function 204 may check the database 203 for whether or not an existing conflict mitigation negotiation agreement exists between all of the relevant xApps. The conflict mitigation function 204 may collect information on xApp usage of RIC services and/or may receive the incoming guidance request from xApp and/or an xApp subscription management function. The conflict mitigation function may detect 2 or more xApp using the same RIC service identified using the E2 node ID, RAN function ID, and/or RIC action type. At 230, the conflict mitigation function 204 may transmit a conflict negotiation request to the one or more other xApps 201, and at 240, the conflict mitigation function 204 may transmit a conflict negotiation request to the xApp 202. The conflict negotiation request message may contain a unique negotiation key, E2AP level conflict identified by the E2 node ID, RAN function ID, and/or RIC action type, and a list of xApps.

In FIG. 2, at 250, the negotiation procedure may be performed by the conflict mitigation function 204 between the one or more other xApps 201 and the xApp 202. The negotiation procedure may be performed iteratively (e.g., in a loop) until a negotiation outcome is determined, such as a successful agreement or a failure to reach an agreement. The xApps 201/202 may negotiate to determine a set of mutually exclusive subsets of the target RFD. At 251, the one or more other xApps 201 and the xApp 202 exchange messages as part of direct negotiation to attempt to reach an agreement for the subsets of the declared E2 Node supported RIC services.

Alternatively, at 252, an indirect negotiation may be implemented in which the one or more other xApps 201 may transmit a negotiation message to the conflict mitigation function 204, and at 253, the conflict mitigation function 204 may transit a conflict mitigation message to the xApp 202, such that the conflict mitigation function 204 facilitates, as an intermediary, the negotiation between the one or more other xApps 201 and the xApp 202. At 254, the xApp 202 may transmit a response message to the conflict mitigation function 204, and at 255, the conflict mitigation function 204 may transmit a response to the one or more xApps 201. Each xApp may reply to the conflict mitigation function with a conflict negotiation response, which includes the unique negotiation key, E2AP level conflict (E2 node ID, RAN function ID, RIC action type), negotiation outcome and subset of the RFDs to be used by each xApp.

Once an outcome of the negotiation is reached (e.g., success or failure to reach an agreement), at 260, the one or more xApps 201 may transmit a conflict negotiation response message to the conflict mitigation function 204 indicating an outcome of the negotiation, and at 270, the xApp 202 may transmit a conflict negotiation response message to the conflict mitigation function 204 also indicating an outcome of the negotiation. At 280, the conflict mitigation function 204 may process the received conflict negotiation response messages, and at 290, the conflict mitigation function 204 may store in the database 203 the outcome of the negotiation. If an agreement is successfully reached, the negotiation agreement may be stored in the database 203.

The conflict mitigation function may perform an audit procedure after determining that a negotiation agreement has been reached. The conflict mitigation function may determine the need to seek audit advice from another xApp that was party to the previously reached negotiation agreement.

As part of the audit procedure, the conflict mitigation function may send a guidance audit request to the selected xApp for receiving the audit advice. The guidance audit request (message) may contain the unique negotiation key, the xApp ID and a copy of the negotiation outcome message from an xApp which needs to be audited by the selected xApp. The selected xApp may compress the message with the agreed subset of RAN Function RFD for each xApp in the agreement and determine if the message is compliant with the xApp agreed subset of RDF. The selected xApp may transmit a reply message to the conflict mitigation function with a guidance audit response (e.g., accept or failure). The message may contain the unique negotiation key and an audit outcome.

Figure 3:
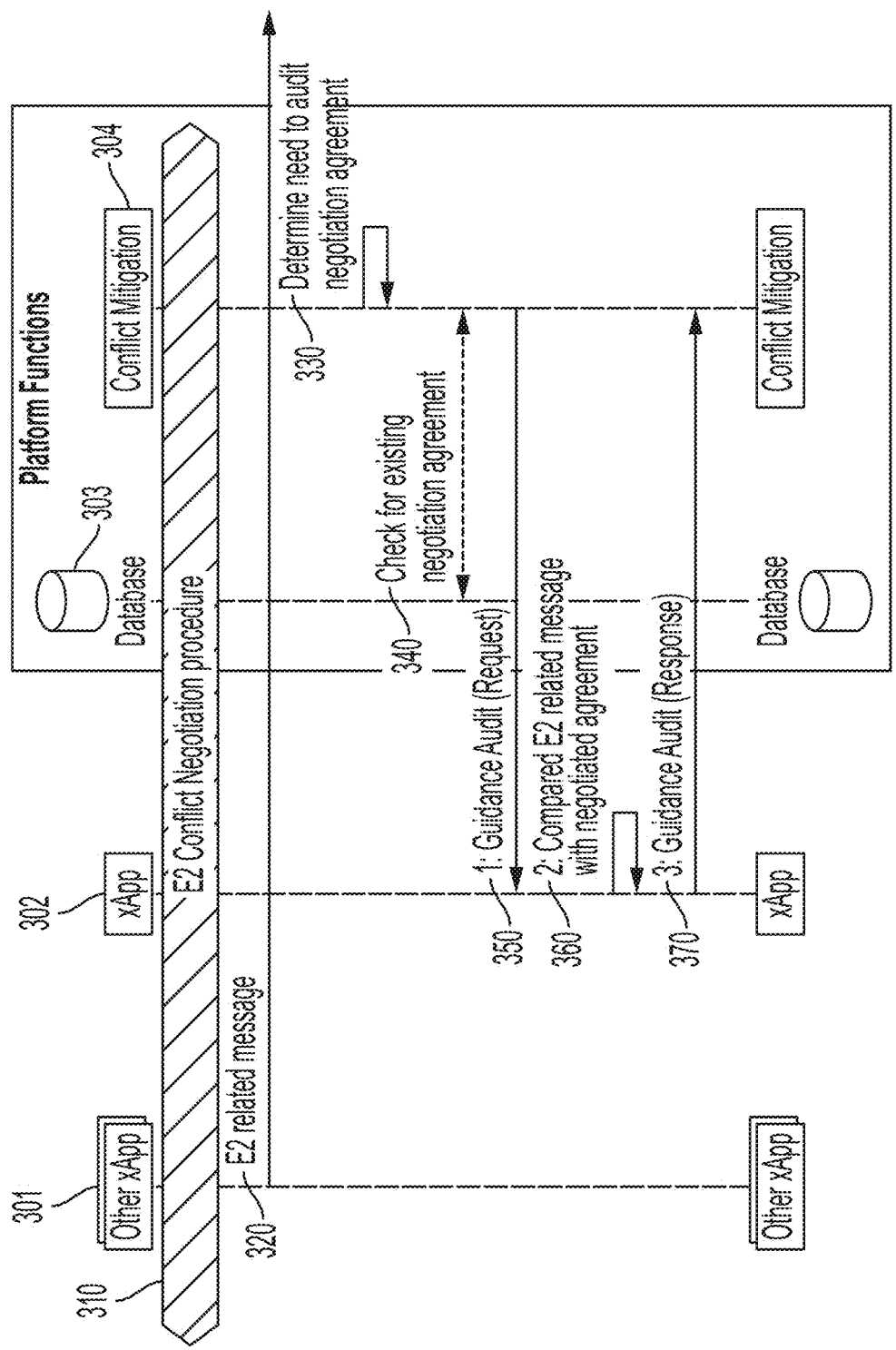
FIG. 3 illustrates an example of a signal diagram for performing an audit procedure of the conflict mitigation, according to certain example embodiments.

FIG. 3 illustrates an example of a signal diagram for performing an audit procedure of the conflict mitigation, according to certain example embodiments. FIG. 3 may include the same xApps and platform functions as FIG. 2. In this example, two or more xApps may be using the same E2AP level RIC service. The conflict mitigation function 204 may have access to sufficient information to detect a potential conflict at the E2AP level (E2 node ID, RAN function ID, RIC action type) and verify if an existing negotiation agreement is in place. The xApps 301/302 may have previously reached a negotiation agreement and informed the conflict mitigation function 304. The conflict mitigation may determine the need to seek an audit advice from another xApp that was party to the previously reached negotiation agreement.

At 310, the E2 conflict negotiation procedure defined in FIG. 2 may be performed to reach a successful negotiation agreement. At 320, the one or more other xApps 201 may transmit an E2-related message to some or all of the xApps and the platform functions, such as the conflict mitigation function 304. At 330, the conflict mitigation function 304 may determine whether there is a need to audit the negotiation agreement stored in the database 303, and at 340, the conflict mitigation function 304 may check with the database 303 for an existing negotiation agreement. At 350, the conflict mitigation function 304 may transmit a guidance audit request to the xApp 302, and at 360, the xApp 302 may compare the E2 related message with the negotiated agreement. The xApp 302 may compare the message with the agreed subset of RAN function RFDs for each xApp in the agreement and determine if the message is compliant with the nominated xApp agreed subset of RFDs. At 370, the xApp 302 may transmit a guidance audit response to the conflict mitigation function 304 indicating whether the negotiation agreement is valid. The xApp 302 may reply to the conflict mitigation function 304 with the guidance audit response, the unique negotiation key, and the audit outcome.

The purpose of the xApp initiated E2 guidance request/response API procedure in the Near-RT RIC may be to allow an authorized xApp to obtain guidance from the conflict mitigation function prior to initiating an action. The conflict mitigation function may provide an indication on whether or not the xApp proposed E2 related API message or series of messages may result in a conflict with E2 related API messages from other xApps, recommendations on how the proposed E2 related message or series of messages should be modified to avoid conflict, and/or modification of previous guidance to other xApps and/or other platform functions. The xApp may use E2 related API to obtain guidance from the conflict mitigation function to resolve potential conflicts prior to initiating a RIC function procedure and use the conflict mitigation function response in a subsequent procedure (i.e., for a RIC functional procedure).

Figure 4:
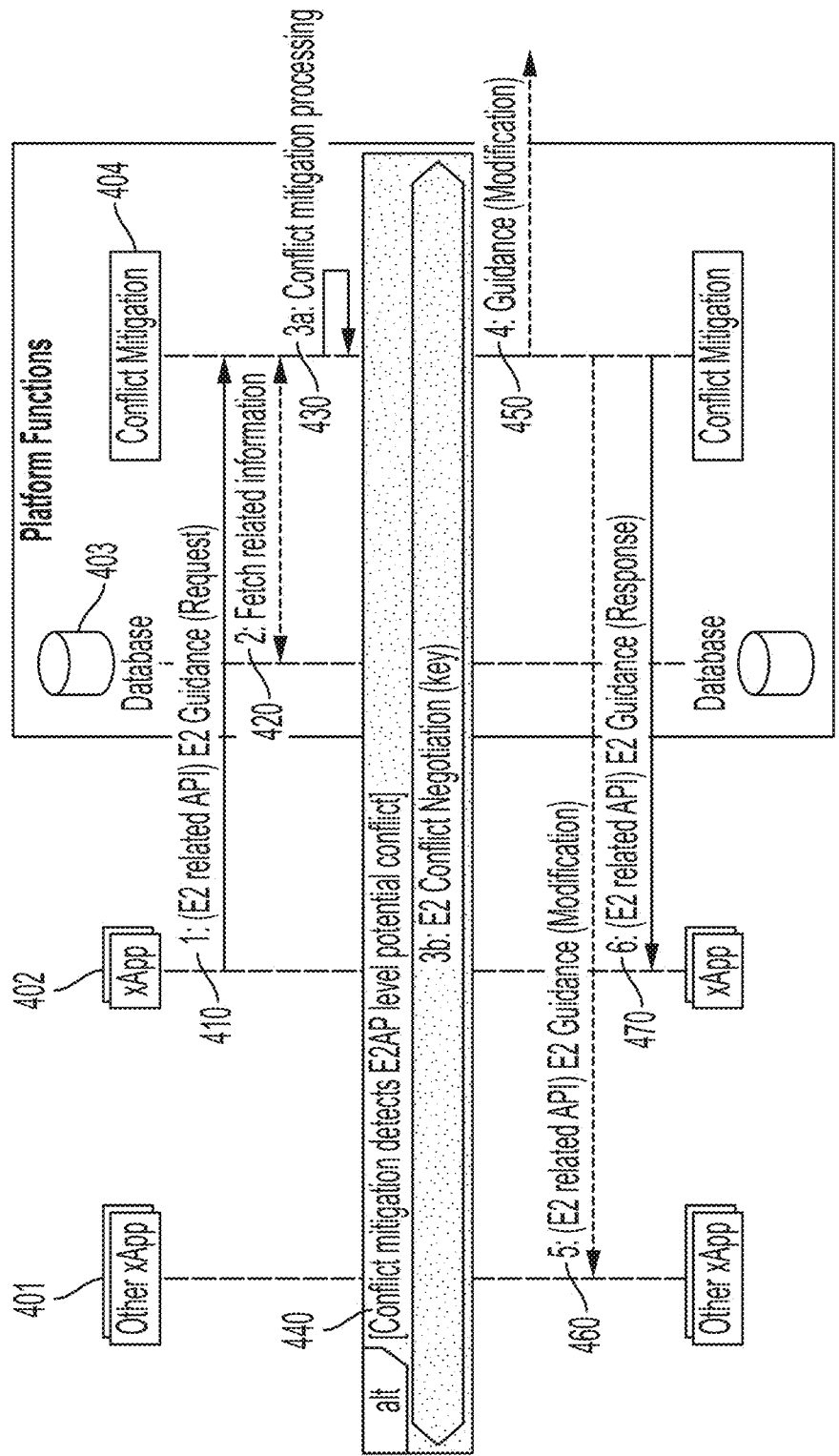
FIG. 4 illustrates an example of a signal diagram for performing conflict mitigation that is initiated by an xApp, according to some example embodiments.

FIG. 4 illustrates an example of a signal diagram for performing conflict mitigation that is initiated by an xApp, according to certain example embodiments. Similar to FIGS. 2 and 3, the network and/or system of FIG. 4 may include one or more other xApps 401, an xApp 402, a database 403, and a conflict mitigation function 404. In this example, the xApp 402 may be the originator of a conflict mitigation guidance request.

At 410, the xApp 402 initiates the conflict negotiation procedures by transmitting an E2 guidance request to the conflict mitigation function 404, and at 420, the conflict mitigation function 404 checks with or retrieves from the database 403 for a negotiation agreement or related information about the xApp and potential conflicts with one or more of the other xApps 401. At 430, the conflict mitigation function 404 may perform a conflict mitigation processing, and if the conflict mitigation function 404 detects a potential E2AP level conflict, at 440, conflict negotiation procedures may be performed, as discussed with respect to FIG. 2. A unique negotiation key may be assigned and sent to all identified xApps detected using the same E2AP level service which are part of the conflict negotiation procedures. If the conflict mitigation function 404 detects an E2AP level potential conflict between 2 or more xApps and previously assigned negotiation keys are not provided, the concerned list of xApps may be requested to initiate E2SM level negotiation. The conflict mitigation function 404 may signal conflict and/or provide guidance to another platform function. If negotiation was successful, the conflict mitigation function 404 may provide a negotiation key for future use.

At 450 in FIG. 4, the conflict mitigation function 404 may generate and transmit guidance or modification information to other platform functions according to the results of the negotiation procedures for conflict mitigation between the one or more other xApps 401 and the xApp 402. At 460, the conflict mitigation function 404 may generate and transmit E2 guidance or modification information to the one or more xApps 401 according to the results of the negotiation procedures, and at 470, the conflict mitigation function 404 may also transmit an E2 guidance response to the xApp 402 according to the results of the negotiation procedures. The conflict mitigation function 404 may signal conflict and/or provide guidance to another xApp using E2 related API E2 guidance or modification. If negotiation was successful, the conflict mitigation function 404 may provide the negotiation key to be used in future transactions.

Figure 5:
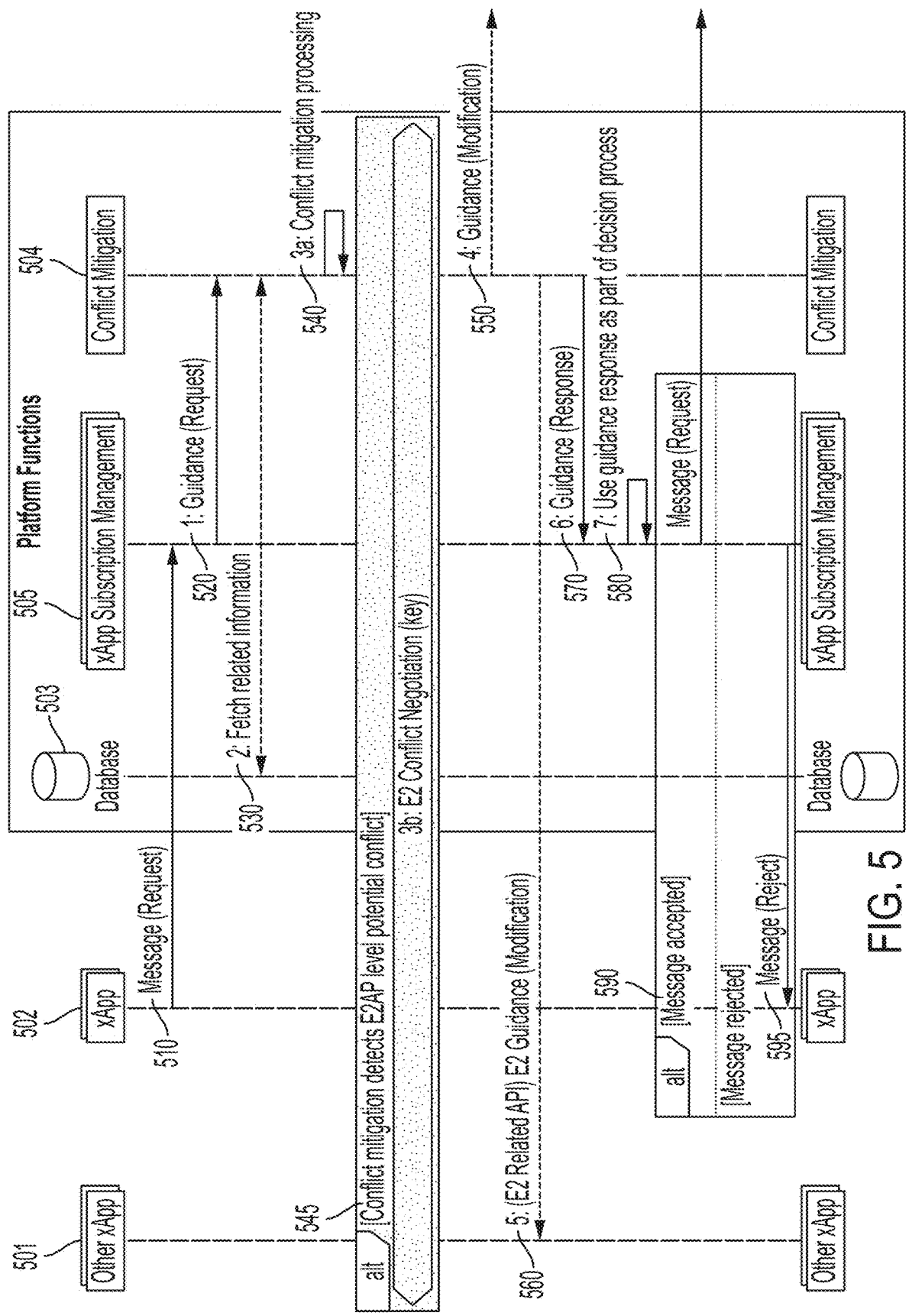
FIG. 5 illustrates an example of a signal diagram for performing conflict mitigation that is initiated by an xApp subscription management function of the platform, according to various example embodiments.

FIG. 5 illustrates an example of a signal diagram for performing conflict mitigation that is initiated by an xApp subscription management function of the platform, according to various example embodiments. The network and/or system of FIG. 5 may include one or more other xApps 501, an xApp 502, a database 503, a conflict mitigation function 504, and an xApp subscription management function 505. The xApp subscription management function 505 may request guidance from the conflict mitigation function 504 to resolve potential conflicts prior to initiating a RIC function procedure. The conflict mitigation function 504 may need to subsequentially modify previous provided Guidance to an xApp 502.

At 510, the xApp 510 may transmit a conflict mitigation request to the xApp subscription management function 505, and at 520, the xApp subscription management function 505 may transmit a guidance request to the conflict management function 504. For example, the xApp subscription management function 505 may detect an E2AP level potential conflict between incoming request sent and previous requests from other xApps and negotiation keys may not have been provided. At 530, the conflict management function 504 may fetch information related to the one or more xApps 501 and/or the xApp 502 relevant to the conflict mitigation. At 540, the conflict management function 504 may perform a conflict mitigation processing, and at 545, when the conflict mitigation function 504 detects a potential E2AP level conflict, conflict negotiation procedures may be performed, as discussed with respect to FIG. 2. A unique negotiation key may be assigned and sent to all identified xApps detected using the same E2AP level service which are part of the conflict negotiation procedures.

At 550, the conflict mitigation function 504 may transmit guidance or modification information to other platform functions, and at 560, the conflict mitigation function 504 may transmit guidance or modification information to the one or more other xApps 501. At 570, the conflict mitigation function 504 may transmit a guidance response to the xApp subscription management function 505, and at 580, the xApp subscription management function 505 uses the guidance response as part of a decision process on whether to accept the request from the xApp 502. At 590, if the request from the xApp 502 to the xApp subscription management function 504 is accepted, the xApp subscription management function 504 may transmit a related request message to other platform functions. At 595, if the request from the xApp 502 to the xApp subscription management function 504 is rejected, the xApp subscription management function 504 may transmit response to the xApp 502 indicating the rejection. When negotiation has been successful, the conflict mitigation function 504 may provide a negotiation key for current and/or future use.

Figure 6:
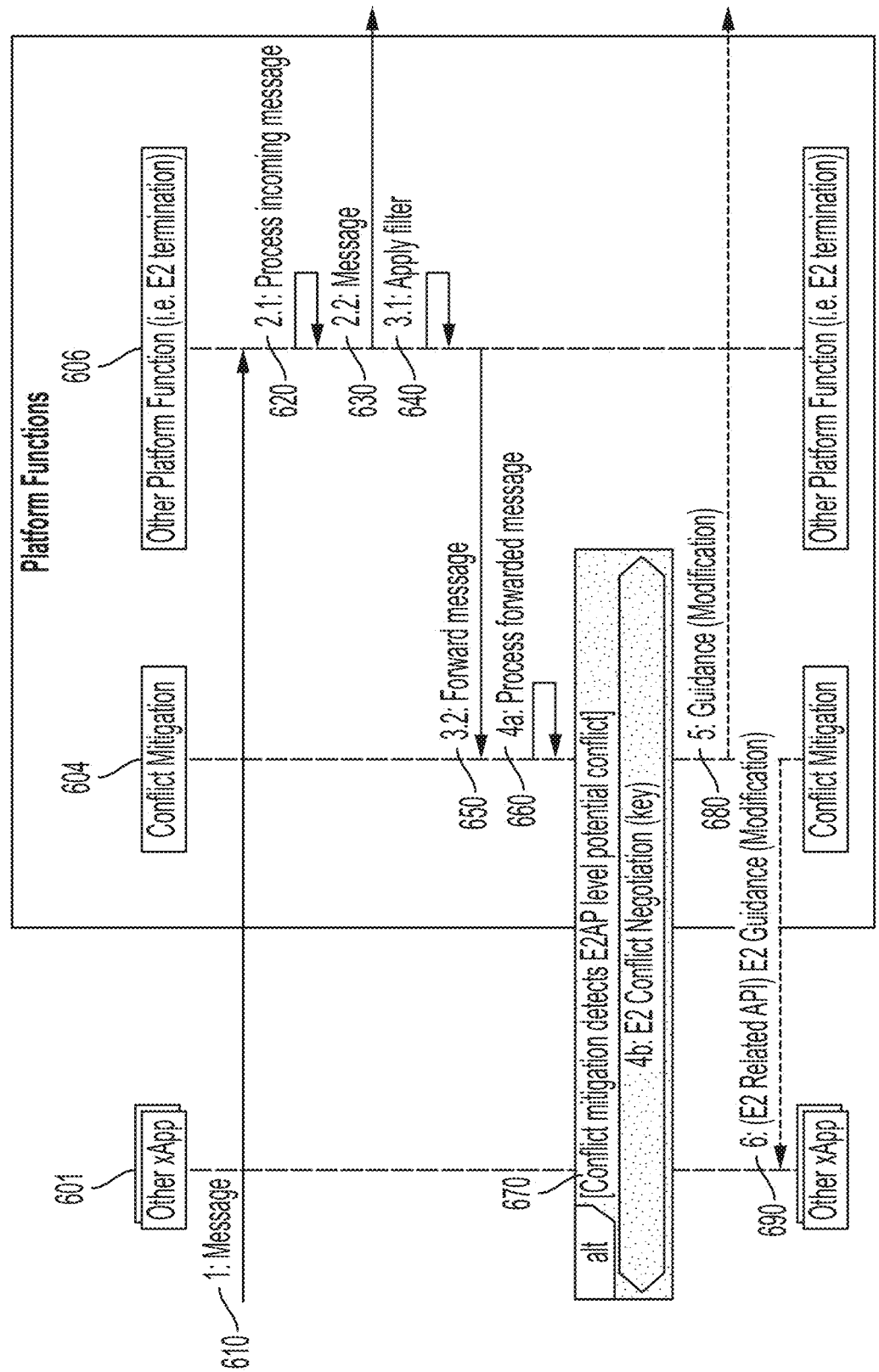
FIG. 6 illustrates an example of a signal diagram for performing conflict mitigation that is initiated by message monitoring, according to various example embodiments.

FIG. 6 illustrates an example of a signal diagram for performing conflict mitigation that is initiated by message monitoring, according to various example embodiments. The network and/or system of FIG. 6 may include one or more other xApps 601, a conflict mitigation function 604, and one or more other platform functions 606. Other platform functions, such as an E2 termination and xApp subscription management functions may be configured to forward messages related to xApp transactions to the conflict mitigation function 604. The conflict mitigation function 604 may use information obtained when formulating responses in a subsequent procedure and/or modify previous guidance to another Near-RT RIC platform function.

At 610, a monitoring message is received by the one or more other platform functions 606. At 620, the platform function 606 may process the incoming message, and at 630, the platform function 606 may transmit a message to other platform functions. At 640, the platform function 606 may apply a filter to the incoming message, and at 650, the platform function 606 may forward the filtered message to the conflict mitigation function 604. The platform function 606 may apply the message filter and determine that the message is to be copied and sent to the conflict mitigation function 604. If filter conditions match and a negotiation key is not provided, the platform function 606 may forward a copy of the incoming message to the conflict mitigation function 604. At 660, the conflict mitigation function 604 may process the forwarded message, and at 670, when the conflict mitigation function 604 detects a potential E2AP level conflict, conflict negotiation procedures may be performed, as discussed with respect to FIG. 2. A unique negotiation key may be assigned and sent to all identified xApps detected using the same E2AP level service which are part of the conflict negotiation procedures.

At 680, the conflict mitigation function 604 may transmit guidance to one or more platform functions. At 690, the conflict mitigation function 604 may transmit E2 guidance to the other xApp 601. The conflict mitigation function 604 may signal conflict and/or provide updated guidance to another platform function. If negotiation was successful, the conflict mitigation function 604 may provide a negotiation key for current and/or future use.

Figure 7:
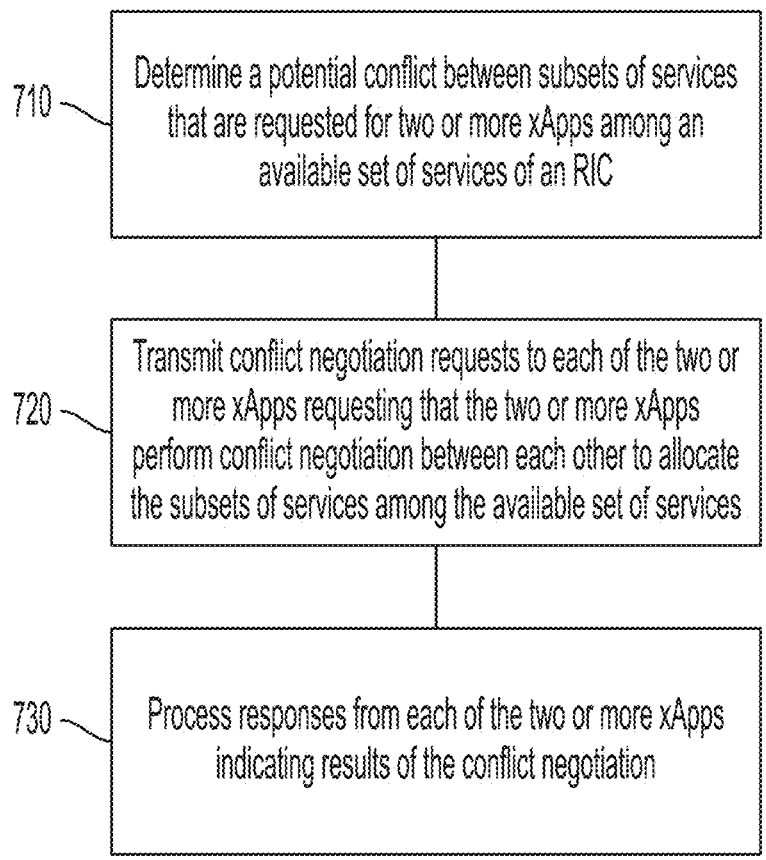
FIG. 7 illustrates an example of a flow diagram of one or more procedures of a method, according to some example embodiments.

FIG. 7 illustrates an example flow diagram of a method, according to certain example embodiments. In an example embodiment, the method of FIG. 7 may be performed by a network element, or a group of multiple network elements in a 3GPP system, such as LTE or 5G-NR. For instance, in an example embodiment, the method of FIG. 7 may be performed by a part of a network or network entity, such as a conflict mitigation function of a platform of a RAN network element, similar to apparatus 910 illustrated in FIG. 9.

According to various example embodiments, the method of FIG. 7 may include, at 710, determining a potential conflict between subsets of services that are requested for two or more xApps among an available set of services of an RIC, and at 720, transmitting conflict negotiation requests to each of the two or more xApps requesting that the two or more xApps perform conflict negotiation between each other to allocate the subsets of services among the available set of services. At 730, the method further includes processing responses from each of the two or more xApps indicating results of the conflict negotiation.

Certain example embodiments may provide that the method further includes receiving the responses from the two or more applications once an agreement has been reached in the conflict negotiation. The conflict negotiation may be performed by direct application to application messaging in which the two or more applications negotiate directly with each other to allocate the subsets of services among the available set of services. Some example embodiments provide that that the method also includes receiving the messages from the two or more applications during the conflict negotiation, which is performed by indirect messaging in which each of the two or more applications transmit messages related to negotiating the subsets of services to the apparatus 910. The received messages are relayed by the apparatus 910 to all other applications of the two or more applications.

Various example embodiments may provide the responses received from the two or more xApps are processed by determining whether all of the responses match each other and indicate agreement. When an agreement is reached, the apparatus 910 may store, in a storage, the agreement and related information for future use by the apparatus 910.

Some example embodiments may provide that the apparatus performs an audit procedure after the conflict negotiation is complete, and the audit procedure confirms with at least one xApp of the two or more xApps that the agreement was reached, and the related information stored in the storage is correct. The audit procedure may be performed by the apparatus 910 transmit an audit request to the at least one xApp of the two or more xApps requesting confirmation of the agreement and the related information stored in the storage which is included in the audit request. The apparatus 910 may receive a response from the at least one xApp that includes audit results of a comparison between the agreement and the related information included in the audit request and information stored on the at least one xApp related to the agreement. The apparatus 910 may receive a unique negotiation key from the at least one xApp in addition to audit results.

Figure 8:
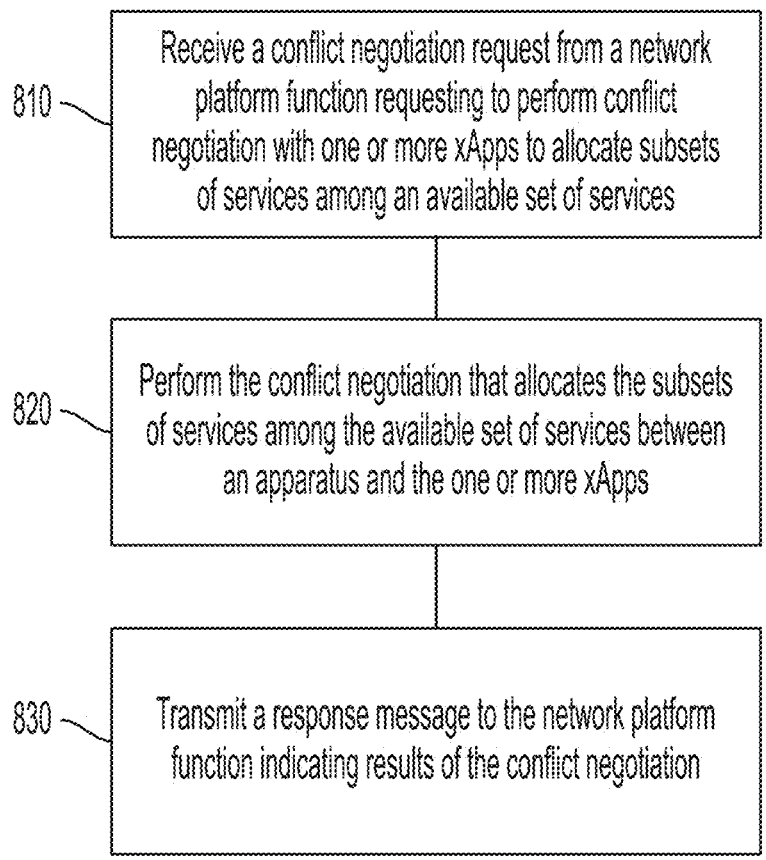
FIG. 8 illustrates an example of a flow diagram of one or more procedures of another method, according to certain example embodiments.

FIG. 8 illustrates an example flow diagram of a method, according to certain example embodiments. In an example embodiment, the method of FIG. 8 may be performed by a network element, or a group of multiple network elements in a 3GPP system, such as LTE or 5G-NR. For instance, in an example embodiment, the method of FIG. 8 may be performed by a part of a network or network entity, such as an xApp of a RAN network element, similar to apparatus 920 illustrated in FIG. 9.

According to various example embodiments, the method of FIG. 8 may include, at 810, receive a conflict negotiation request from a network platform function, such as apparatus 910, requesting to perform conflict negotiation with one or more xApps to allocate subsets of services among an available set of services. At 820, the method further includes performing the conflict negotiation that allocates the subsets of services among the available set of services between the apparatus 920 and the one or more xApps, and at 830, transmitting a response message to the network platform function indicating results of the conflict negotiation.

Certain example embodiments may provide that the method further includes performing direct application to application messaging during the conflict negotiation in which the apparatus 920 and the one or more xApps negotiate directly with each other to allocate the subsets of services among the available set of services. Once an agreement has been reached, each of the apparatus 920 and the one or more xApps may transmit response messages to the network platform function. Some example embodiments may provide that the method further includes performing indirect messaging during the conflict negotiation in which the apparatus 920 transmits and receives messages related to negotiating the subsets of services with the network platform function, which relays the messages between all other xApps of the one or more xApps.

Various example embodiments may provide that the method further receives guidance information from the network platform function including the subsets of services allocated to the apparatus 920. The method may also perform an audit procedure after the conflict negotiation is complete. The audit procedure may perform an audit procedure after the conflict negotiation is complete, and the audit procedure may confirm compliance with the agreement and related information stored in a storage accessible by the network platform function is correct.

Some example embodiments may provide that the method also receives an audit request from the network platform function requesting confirmation that a message from another application is in compliance with the agreement and the related information stored in the storage which is also included in the audit request, and transmit a response to the network platform function that includes audit results of a comparison between the agreement and the related information included in the audit request and information stored by the apparatus related to the agreement. The apparatus 920 may transmit a unique negotiation key to the network platform function in addition to audit results. The apparatus 920 may provide the unique negotiation key in a subsequent message indicating that the subsequent message complies with the results of the conflict negotiation.

Figure 9:
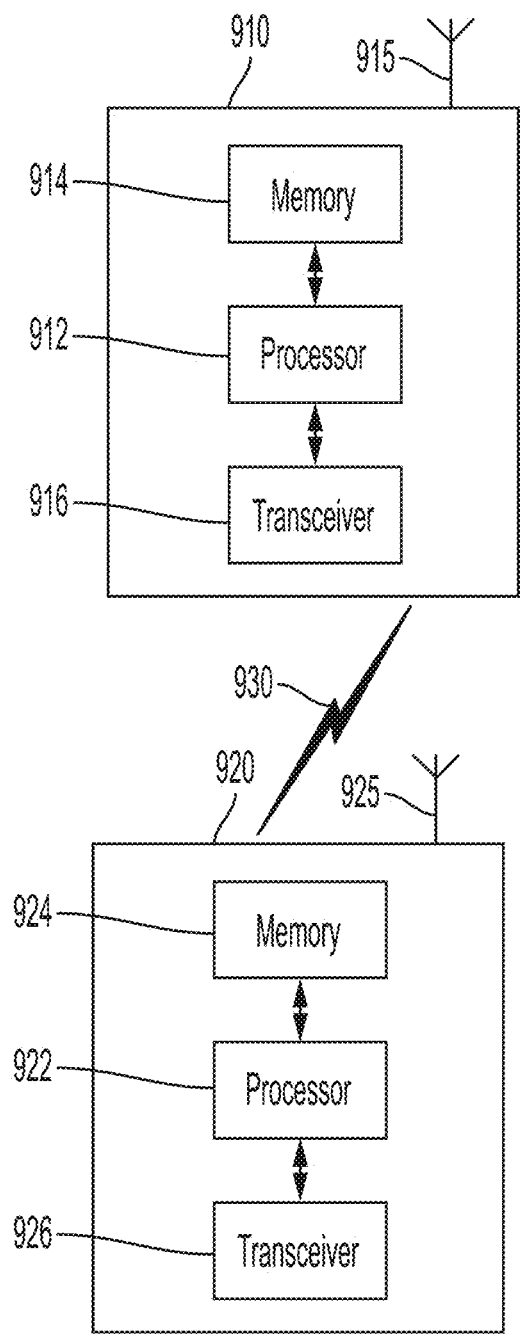
FIG. 9 illustrates a set of apparatuses, according to various example embodiments.

FIG. 9 illustrates a configuration of apparatus 910 and apparatus 920 according to various example embodiments. In the various example embodiments, the apparatus 910 may be a network, network entity, element of the RAN network, or element in a communications network or associated with such a network, such as a base station, an NE, or a gNB. For example, the apparatus 910 may be an example of a conflict mitigation function 204/304/404/504/604 as discussed herein. However, in other example embodiments, apparatus 910 may include components or features not shown in FIG. 9. The apparatus 920 may be a network, network entity, element of the RAN network, or element in a communications network or associated with a network, such as a base station, an NE, or a gNB. For example, the apparatus 920 may be an example of an xApp 202/302/402/502/601 as discussed herein. However, in other example embodiments, apparatus 920 may include components or features not shown in FIG. 9.

According to various example embodiments, the apparatus 910 may include at least one processor, and at least one memory, as shown in FIG. 9. The memory may store instructions that, when executed by the processor, cause the apparatus 910 to determine a potential conflict between subsets of services that are requested for two or more applications among an available set of services of an intelligent controller, and transmit conflict negotiation requests to each of the two or more applications requesting that the two or more applications perform conflict negotiation between each other to allocate the subsets of services among the available set of services. The apparatus 910 may further be caused to process responses from each of the two or more applications indicating results of the conflict negotiation.

According to various example embodiments, the apparatus 920 may include at least one processor, and at least one memory, as shown in FIG. 9. The memory may store instructions that, when executed by the processor, cause the apparatus 920 to receive a conflict negotiation request from a network platform function requesting to perform conflict negotiation with one or more applications to allocate subsets of services among an available set of services, and perform the conflict negotiation that allocates the subsets of services among the available set of services between the apparatus and the one or more applications. The apparatus 920 may also be caused to transmit a response message to the network platform function indicating results of the conflict negotiation.

Various example embodiments described above may provide several technical improvements, enhancements, and/or advantages. For instance, some example embodiments may provide advantages of one or more procedures for a conflict mitigation function to detect a potential conflict between two or more xApps and then initiate a negotiation between the identified xApps to identify and resolve these conflicts without requiring the platform to understand the E2SM level encoding. The various example embodiments may avoid the need for the Near-RT RIC platform to decode the E2SM level messages. Certain example embodiments may also be applied when a conflict mitigation process needs to rely on negotiation between potential sources of conflict without needing to understand the specific details of the mechanisms used by these processes.

In some example embodiments, apparatuses 910 and/or 920 may each include one or more processors, one or more computer-readable storage medium (for example, memory, storage, or the like), one or more radio access components (for example, a modem, a transceiver, or the like), and/or a user interface. In some example embodiments, apparatuses 910 and/or 920 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 9, apparatuses 910 and/or 920 may include or be coupled to processor 912/922 for processing information and executing instructions or operations. Processor 912/922 may be any type of general or specific purpose processor. In fact, processor 912/922 may include one or more of general-purpose computers, special purpose computers, microprocessors, DSPs, field-programmable gate arrays (FPGAs), ASICs, and processors based on a multi-core processor architecture, as examples. While a single processor 912 for apparatus 910 (and processor 922 for apparatus 920) is shown in FIG. 9, multiple processors may be utilized according to other example embodiments. For example, it should be understood that, in certain example embodiments, apparatuses 910 and/or 920 may include two or more processors that may form a multiprocessor system (for example, in this case processor 912 (and processor 922) may represent a multiprocessor) that may support multiprocessing. According to certain example embodiments, the multiprocessor system may be tightly coupled or loosely coupled to, for example, form a computer cluster.

Processor 912 (and processor 922) may perform functions associated with the operation of apparatus 910 (and apparatus 920) including, as some examples, precoding of antenna gain/phase parameters, encoding and decoding of individual bits forming a communication message, formatting of information, and overall respective control of the apparatuses 910 and/or 920, including processes illustrated in FIGS. 2-8.

Apparatuses 910 and/or 920 may further include or be coupled to memory 914/924 (internal or external), which may be coupled to processor 912/922, for storing information and instructions that may be executed by processor 912/922. Memory 914/924 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 914/924 can include any combination of random access memory (RAM), read only memory (ROM), static storage such as a magnetic or optical disk, hard disk drive (HDD), or any other type of non-transitory machine or computer readable media. The instructions stored in memory 914/924 may include program instructions or computer program code that, when executed by processor 912/922, enable the apparatuses 910/920 to perform tasks as described herein.

In certain example embodiments, apparatuses 910/920 may further include or be coupled to (internal or external) a drive or port that is configured to accept and read an external computer readable storage medium, such as an optical disc, universal serial bus (USB) drive, flash drive, or any other storage medium. For example, the external computer readable storage medium may store a computer program or software for execution by processor 912/922 and/or apparatuses 910/920 to perform any of the methods illustrated in FIGS. 2-8.

In some example embodiments, apparatuses 910/920 may also include or be coupled to one or more antennas 915/925 for receiving a downlink signal and for transmitting via an uplink from apparatuses 910/920. Apparatuses 910/920 may further include a transceiver 2516 configured to transmit and receive information. The transceiver 2516 may also include a radio interface that may correspond to a plurality of radio access technologies including one or more of GSM, LTE, LTE-A, 5G, NR, WLAN, NB-IoT, Bluetooth, BT-LE, NFC, RFID, UWB, or the like. The radio interface may include other components, such as filters, converters (for example, digital-to-analog converters or the like), symbol demappers, signal shaping components, an Inverse Fast Fourier Transform (IFFT) module, or the like, to process symbols, such as orthogonal frequency division multiple access (OFDMA) symbols, carried by a downlink or an uplink.

For instance, transceiver 916/926 may be respectively configured to modulate information on to a carrier waveform for transmission and demodulate received information for further processing by other elements of apparatuses 910/920. In other example embodiments, transceiver 916/926 may be capable of transmitting and receiving signals or data directly. Additionally or alternatively, in some example embodiments, apparatuses 910/920 may include an input and/or output device (I/O device). In certain example embodiments, apparatuses 910/920 may further include a user interface, such as a graphical user interface or touchscreen.

In certain example embodiments, memory 914/924 stores software modules that provide functionality when executed by processor 912/922. The modules may include, for example, an operating system that provides operating system functionality for apparatuses 910/920. The memory 914/924 may also store one or more functional modules, such as an application or program, to provide additional functionality for apparatuses 910/920. The components of apparatuses 910/920 may be implemented in hardware, or as any suitable combination of hardware and software. According to certain example embodiments, apparatuses 910/920 may optionally be configured to communicate with one or more wired or wireless communications links, according to any radio access technology, such as NR.

According to certain example embodiments, processor 912/922 and memory 914/924 may be included in or may form a part of processing circuitry or control circuitry. In addition, in some example embodiments, transceiver 916/926 may be included in or may form a part of transceiving circuitry.

In some example embodiments, an apparatus (e.g., apparatuses 910/920) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for determining a potential conflict between subsets of services that are requested for two or more applications among an available set of services of an intelligent controller, and means for transmitting conflict negotiation requests to each of the two or more applications requesting that the two or more applications perform conflict negotiation between each other to allocate the subsets of services among the available set of services. The apparatus may also include means for processing responses from each of the two or more applications indicating results of the conflict negotiation.

Certain example embodiments may be directed to an apparatus that includes means for performing any of the methods described herein including, for example, means for receiving a conflict negotiation request from a network platform function requesting to perform conflict negotiation with one or more applications to allocate subsets of services among an available set of services, and means for performing the conflict negotiation that allocates the subsets of services among the available set of services between the apparatus and the one or more applications. The apparatus may also include means for transmitting a response message to the network platform function indicating results of the conflict negotiation.

As used herein, the term "circuitry" may refer to hardware-only circuitry implementations (for example, analog and/or digital circuitry), combinations of hardware circuits and software, combinations of analog and/or digital hardware circuits with software/firmware, any portions of hardware processor(s) with software, including digital signal processors, that work together to cause an apparatus (for example, apparatuses 910/920) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor or multiple processors, or portion of a hardware circuit or processor, and the accompanying software and/or firmware. The term circuitry may also cover, for example, a baseband integrated circuit in a server, cellular network node or device, or other computing or network device.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (for example, apparatuses 910/920), for example through the use of an ASIC, a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer, or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

The invention claimed is:

1. An apparatus comprising:
   at least one processor; and
   at least one memory storing instructions that, when executed by the at least one processor, cause the apparatus at least to:
   determine a potential conflict between subsets of services that are requested for two or more applications among an available set of services of an intelligent controller;
   transmit conflict negotiation requests to each of the two or more applications requesting that the two or more applications perform conflict negotiation between each other to allocate the subsets of services among the available set of services, the requests comprising a unique negotiation key identifying the negotiation process; and
   process responses from each of the two or more applications indicating results of the conflict negotiation.

2. The apparatus according to claim 1, wherein the at least one memory and the instructions, when executed by the at least one processor, further cause the apparatus at least to:
   receive the responses from the two or more applications once an agreement has been reached in the conflict negotiation, wherein the conflict negotiation is performed by direct application to application messaging in which the two or more applications negotiate directly with each other to allocate the subsets of services among the available set of services.

3. The apparatus according to claim 1, wherein the at least one memory and the instructions, when executed by the at least one processor, further cause the apparatus at least to:
   receive the messages from the two or more applications during the conflict negotiation, wherein the conflict negotiation is performed by indirect messaging in which each of the two or more applications transmit messages related to negotiating the subsets of services to the apparatus, and relay the received messages to all other applications of the two or more applications.

4. The apparatus according to claim 1, wherein the at least one memory and the instructions, when executed by the at least one processor, further cause the apparatus at least to:
process the responses received from the two or more applications by determining whether all of the responses match each other and indicate agreement, and
when an agreement is reached, store, in a storage, the agreement and related information for future use by the apparatus.

5. The apparatus according to claim 1, wherein the at least one memory and the instructions, when executed by the at least one processor, further cause the apparatus at least to:
perform an audit procedure after the conflict negotiation is complete, and wherein the audit procedure confirms with at least one application of the two or more applications that the agreement was reached and the related information stored in the storage is correct.

6. The apparatus according to claim 5, wherein the at least one memory and the instructions, when executed by the at least one processor, further cause the apparatus at least to:
transmit an audit request to the at least one application of the two or more applications requesting confirmation of the agreement and the related information stored in the storage which is included in the audit request, and
receive a response from the at least one application that includes audit results of a comparison between the agreement and the related information included in the audit request and information stored on the at least one application related to the agreement.

7. The apparatus according to claim 5, wherein the at least one memory and the instructions, when executed by the at least one processor, further cause the apparatus at least to:
transmit to other platform functions that subsequent service requests from applications comprising the unique negotiation key are considered to be without conflict.

8. An apparatus comprising:
at least one processor; and
at least one memory storing instructions that, when executed by the at least one processor, cause the apparatus at least to:
receive a conflict negotiation request from a network platform function requesting to perform conflict negotiation with one or more applications to allocate subsets of services among an available set of services the request comprising a unique negotiation key identifying the negotiation process;
perform the conflict negotiation that allocates the subsets of services among the available set of services between the apparatus and the one or more applications; and
transmit a response message to the network platform function indicating results of the conflict negotiation.

9. The apparatus according to claim 8, wherein the at least one memory and the instructions, when executed by the at least one processor, further cause the apparatus at least to:
perform direct application to application messaging during the conflict negotiation in which the apparatus and the one or more applications negotiate directly with each other to allocate the subsets of services among the available set of services, and wherein once an agreement has been reached, each of the apparatus and the one or more applications transmit response messages to the network platform function.

10. The apparatus according to claim 8, wherein the at least one memory and the instructions, when executed by the at least one processor, further cause the apparatus at least to:
perform indirect messaging during the conflict negotiation in which the apparatus transmits and receives messages related to negotiating the subsets of services with the network platform function, which relays the messages between all other applications of the one or more applications.

11. The apparatus according to claim 8, wherein the at least one memory and the instructions, when executed by the at least one processor, further cause the apparatus at least to:
receive guidance information from the network platform function including the subsets of services previously allocated to the apparatus.

12. The apparatus according to claim 8, wherein the at least one memory and the instructions, when executed by the at least one processor, further cause the apparatus at least to:
perform an audit procedure after the conflict negotiation is complete, and wherein the audit procedure confirms compliance with the agreement and related information stored in a storage accessible by the network platform function is correct.

13. The apparatus according to claim 12, wherein the at least one memory and the instructions, when executed by the at least one processor, further cause the apparatus at least to:
receive an audit request from the network platform function requesting confirmation that a message from another application is in compliance with the agreement and the related information stored in the storage which is also included in the audit request, and
transmit a response to the network platform function that includes audit results of a comparison between the agreement and the related information included in the audit request and information stored by the apparatus related to the agreement.

14. The apparatus according to claim 12, wherein the at least one memory and the instructions, when executed by the at least one processor, further cause the apparatus at least to:
transmit the unique negotiation key to the network platform function in addition to audit results.

15. The apparatus according to claim 8, wherein the at least one memory and the instructions, when executed by the at least one processor, further cause the apparatus at least to:
provide the unique negotiation key in a subsequent message indicating that the subsequent message complies with the results of the conflict negotiation.

* * * * *